United States Patent
Balasubramanian et al.

(10) Patent No.: US 9,894,589 B2
(45) Date of Patent: Feb. 13, 2018

(54) METHODS AND APPARATUS FOR COORDINATING SYSTEM SELECTION AMONG A SET OF NODES

(71) Applicant: QUALCOMM Incorporated, San Diego, CA (US)

(72) Inventors: Srinivasan Balasubramanian, San Diego, CA (US); Arvind Vardarajan Santhanam, San Diego, CA (US); Abhishek Bhatnagar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 247 days.

(21) Appl. No.: 14/666,928

(22) Filed: Mar. 24, 2015

(65) Prior Publication Data

US 2015/0282044 A1    Oct. 1, 2015

Related U.S. Application Data

(60) Provisional application No. 61/972,066, filed on Mar. 28, 2014.

(51) Int. Cl.
H04W 40/10    (2009.01)
H04W 24/08    (2009.01)
(Continued)

(52) U.S. Cl.
CPC ........... *H04W 40/10* (2013.01); *H04W 24/08* (2013.01); *H04W 36/0094* (2013.01);
(Continued)

(58) Field of Classification Search
CPC ..... H04W 48/16; H04W 48/18; H04W 36/14; H04W 24/08; H04W 36/0094;
(Continued)

(56) References Cited

U.S. PATENT DOCUMENTS 8,254,332 B2    8/2012  Bertorelle et al.
8,423,084 B2 *  4/2013  Abramov ............... H01Q 1/246
                                                370/330
(Continued)

FOREIGN PATENT DOCUMENTS

WO    WO-2010/118379 A1    10/2010
WO    WO-2010/132710 A1    11/2010
WO    WO-2015/002656 A1    1/2015

OTHER PUBLICATIONS

Dunn D., "Kyocera, Nokia and RIM MMSS Proposal", 3GPP2 Draft; C14-MMSS-20061030-003_UPDATED_KYO_NOK_RIM_MMSS_PROPOSAL, 3rd Generation Partnership Project 2, 3GPP2, 2500 Wilson Boulevard, Suite 300, Arlington, Virginia 22201; USA, vol. TSGC, Nov. 1, 2006 (Nov. 1, 2006), pp. 1-28, XP062205296, Retrieved from the Internet: URL: http://ftp.3gpp2.org/TSGC/Working/2006/2006-10-Northbrook/TSG-C-2006-10-Northbrook/WG1/SWG14/MMSS Ad Hoc/ [retrieved on Nov. 1, 2006] 4.3.3.4, 4.4.3.3.
(Continued)

*Primary Examiner* — Michael Thier
*Assistant Examiner* — Rownak Islam
(74) *Attorney, Agent, or Firm* — Arent Fox LLP

(57) ABSTRACT

Methods, computer-readable medium, and apparatus are described for coordinating system selection among a set of nodes. The described aspects include determining that a node is part of a subset of nodes, wherein each node in the subset of nodes performs one or more system scans for a set of nodes that includes the subset of nodes, performing the one or more system scans by the node on one or more Radio Access Technologies (RATs) in response to determining that the node is part of the subset of nodes, obtaining one or more system scan results from the one or more system scans on
(Continued)

the one or more RATs, and transmitting the one or more system scan results to the set of nodes.

26 Claims, 11 Drawing Sheets

(51) Int. Cl.
*H04W 52/02* (2009.01)
*H04W 36/00* (2009.01)
*H04W 48/16* (2009.01)
*H04W 36/14* (2009.01)

(52) U.S. Cl.
CPC ....... *H04W 48/16* (2013.01); *H04W 52/0203* (2013.01); *H04W 36/14* (2013.01); *Y02B 60/50* (2013.01)

(58) Field of Classification Search
CPC . H04W 52/0203; H04W 40/10; H04W 24/00; H04W 52/0229; H04W 40/02; H04W 52/02; Y02B 60/50
USPC .................................................. 370/329, 328
See application file for complete search history.

(56) References Cited

U.S. PATENT DOCUMENTS

| | | | |
|---|---|---|---|
| 8,644,193 B2 | 2/2014 | Schein et al. | |
| 2002/0144162 A1* | 10/2002 | Tada | G06F 1/3203 713/300 |
| 2008/0182615 A1 | 7/2008 | Xue et al. | |
| 2009/0068969 A1* | 3/2009 | Lindoff | H04W 48/18 455/161.1 |
| 2009/0219941 A1* | 9/2009 | Cardozo | H04L 12/42 370/406 |
| 2012/0302241 A1 | 11/2012 | Klingenbrunn et al. | |
| 2013/0137423 A1 | 5/2013 | Das et al. | |
| 2013/0196651 A1* | 8/2013 | Ekici | H04W 52/0206 455/426.1 |
| 2013/0244723 A1* | 9/2013 | Yerrabommanahalli | H04W 48/16 455/552.1 |
| 2015/0005023 A1* | 1/2015 | Wang | H04W 48/18 455/509 |

OTHER PUBLICATIONS

International Search Report and Written Opinion—PCT/US2015/022580—ISA/EPO—dated Jun. 11, 2015. (12 total pages).

* cited by examiner

METHODS AND APPARATUS FOR COORDINATING SYSTEM SELECTION AMONG A SET OF NODES

CLAIM OF PRIORITY UNDER 35 U.S.C. § 119

The present Application for Patent claims priority to U.S. Provisional Application No. 61/972,066 entitled "METHODS AND APPARATUS FOR COORDINATING SYSTEM SELECTION AMONG A SET OF NODES" filed Mar. 28, 2014, assigned to the assignee hereof and hereby expressly incorporated herein by reference.

BACKGROUND

The present disclosure relates generally to communication systems, and more particularly, to coordinate system selection among a set of nodes.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

In some wireless communication networks, inefficient use of available communication resources in communicating data to and from a network may result in significant degradations in wireless communication performance and quality. Specifically, inefficient system selection among nodes may cause excess power consumption and long system selection times. Further, in such scenarios, limitations may exist in remedying the manner in which system selection is performed. Thus, improvements in system selection are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with an aspect, the present methods relate to coordinating system selection among a set of nodes during wireless communication. The described aspects include determining that a node is part of a subset of nodes, wherein each node in the subset of nodes performs one or more system scans for a set of nodes that includes the subset of nodes, and wherein the node is determined to be part of the subset of nodes based at least in part on one or more characteristics of the node; performing the one or more system scans by the node on one or more Radio Access Technologies (RATs) in response to determining that the node is part of the subset of nodes; obtaining one or more system scan results from the one or more system scans on the one or more RATs; and transmitting the one or more system scan results to the set of nodes, wherein each node in the set of nodes is configured to determine whether to switch from a first RAT to a second RAT based at least in part on the one or more system scan results.

In another aspect, a computer-readable medium storing computer executable code relates to code for coordinating system selection among a set of nodes during wireless communication. The described aspects include code for determining that a node is part of a subset of nodes, wherein each node in the subset of nodes performs one or more system scans for a set of nodes that includes the subset of nodes, and wherein the node is determined to be part of the subset of nodes based at least in part on one or more characteristics of the node; code for performing the one or more system scans by the node on one or more Radio Access Technologies (RATs) in response to determining that the node is part of the subset of nodes; code for obtaining one or more system scan results from the one or more system scans on the one or more RATs; and code for transmitting the one or more system scan results to the set of nodes, wherein each node in the set of nodes is configured to determine whether to switch from a first RAT to a second RAT based at least in part on the one or more system scan results.

In a further aspect, an apparatus relates to coordinating system selection among a set of nodes during wireless communication. The described aspects include means for determining that a node is part of a subset of nodes, wherein each node in the subset of nodes performs one or more system scans for a set of nodes that includes the subset of nodes, and wherein the node is determined to be part of the subset of nodes based at least in part on one or more characteristics of the node; means for performing the one or more system scans by the node on one or more Radio Access Technologies (RATs) in response to determining that the node is part of the subset of nodes; means for obtaining one or more system scan results from the one or more system scans on the one or more RATs; and means for transmitting the one or more system scan results to the set of nodes, wherein each node in the set of nodes is configured to determine whether to switch from a first RAT to a second RAT based at least in part on the one or more system scan results.

In another aspect, an apparatus relates to coordinating system selection among a set of nodes during wireless communication. The described aspects include a determining component configured to determine that a node is part of a subset of nodes, wherein each node in the subset of nodes performs one or more system scans for a set of nodes that includes the subset of nodes, and wherein the node is determined to be part of the subset of nodes based at least in part on one or more characteristics of the node; a scanning component configured to perform the one or more system scans by the node on one or more Radio Access Technologies (RATs) in response to determining that the node is part of the subset of nodes; a system selection component configured to obtain one or more system scan results from the one or more system scans on the one or more RATs; and wherein the system selection component is further configured to transmit the one or more system scan results to the set of nodes, wherein each node in the set of nodes is configured to determine whether to switch from a first RAT to a second RAT based at least in part on the one or more system scan results.

In another aspect, the present methods relate to coordinating system selection among a set of nodes during wireless communication. The described aspects include determining that a node is part of a first subset of nodes, wherein each node in the first subset is prohibited from performing one or more system scans on one or more Radio Access Technologies (RATs), and wherein the determining is based at least in part on one or more characteristics of the node; monitoring for one or more system scan results transmitted by a second subset of nodes, wherein each node in the second subset performs one or more system scans for a set of nodes that at least includes the first subset of nodes; receiving the one or more system scan results from the second subset of nodes; and determining whether to switch from a first RAT to a second RAT based at least in part on the one or more system scan results.

In another aspect, a computer-readable medium storing computer executable code relates to code for coordinating system selection among a set of nodes during wireless communication. The described aspects include code for determining that a node is part of a first subset of nodes, wherein each node in the first subset is prohibited from performing one or more system scans on one or more Radio Access Technologies (RATs), and wherein the determining is based at least in part on one or more characteristics of the node; code for monitoring for one or more system scan results transmitted by a second subset of nodes, wherein each node in the second subset performs one or more system scans for a set of nodes that at least includes the first subset of nodes; code for receiving the one or more system scan results from the second subset of nodes; and code for determining whether to switch from a first RAT to a second RAT based at least in part on the one or more system scan results.

In a further aspect, an apparatus relates to coordinating system selection among a set of nodes during wireless communication. The described aspects include means for determining that a node is part of a first subset of nodes, wherein each node in the first subset is prohibited from performing one or more system scans on one or more Radio Access Technologies (RATs), and wherein the determining is based at least in part on one or more characteristics of the node; means for monitoring for one or more system scan results transmitted by a second subset of nodes, wherein each node in the second subset performs one or more system scans for a set of nodes that at least includes the first subset of nodes; means for receiving the one or more system scan results from the second subset of nodes; and means for determining whether to switch from a first RAT to a second RAT based at least in part on the one or more system scan results.

In another aspect, an apparatus relates to coordinating system selection among a set of nodes during wireless communication. The described aspects include a determining component is configured to determine that a node is part of a first subset of nodes, wherein each node in the first subset is prohibited from performing one or more system scans on one or more Radio Access Technologies (RATs), and wherein the determining is based at least in part on one or more characteristics of the node; a monitoring component is configured to monitor for one or more system scan results transmitted by a second subset of nodes, wherein each node in the second subset performs one or more system scans for a set of nodes that at least includes the first subset of nodes; a system selection component is configured to receive the one or more system scan results from the second subset of nodes; and a switching component is configured to determine whether to switch from a first RAT to a second RAT based at least in part on the one or more system scan results.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

Figure 1:
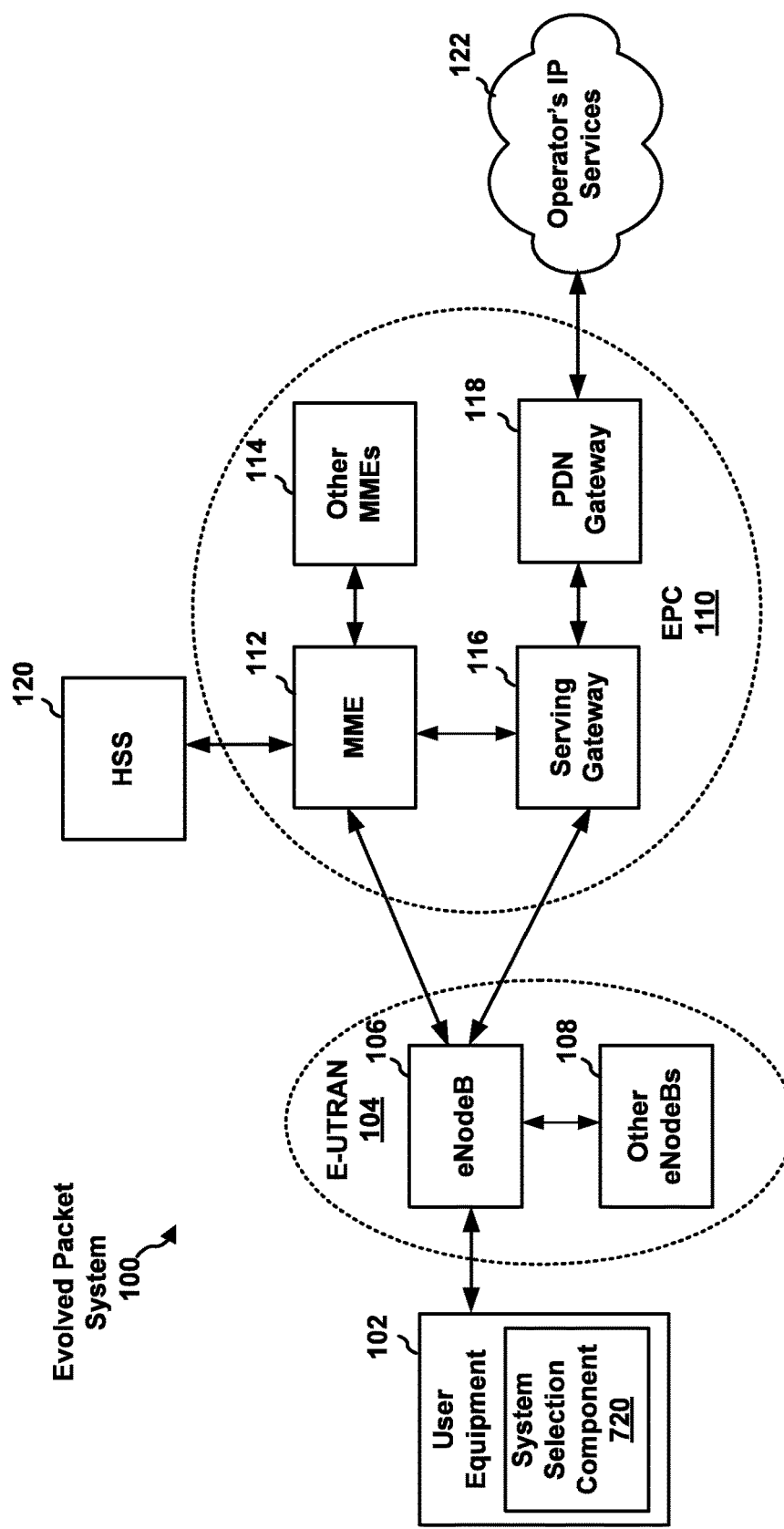
FIG. 1 is a diagram illustrating an example of a network architecture according to an aspect of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts. In an aspect, the term "component" as used herein may be one of the parts that make up a system, may be hardware or software, and may be divided into other components.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The term "small cell" (or "small coverage cell"), as used herein, may refer to an access point or to a corresponding coverage area of the access point, where the access point in this case has a relatively low transmit power or relatively small coverage as compared to, for example, the transmit power or coverage area of a macro network access point or macro cell. For instance, a macro cell may cover a relatively large geographic area, such as, but not limited to, several kilometers in radius. In contrast, a small cell may cover a relatively small geographic area, such as, but not limited to, a home, a building, or a floor of a building. As such, a small cell may include, but is not limited to, an apparatus such as a base station (BS), an access point, a femto node, a femtocell, a pico node, a micro node, a Node B, evolved Node B (eNB), home Node B (HNB) or home evolved Node B (HeNB). Therefore, the term "small cell," as used herein, refers to a relatively low transmit power and/or a relatively small coverage area cell as compared to a macro cell.

The present aspects generally relate to multi-mode system selection (MMSS) procedures performed by nodes, such as user equipment, in a wireless communication system. MMSS enables a node to prioritize node preference for selecting particular radio air-interfaces (AI) across multiple standards (e.g., 3GPP, 3GPP2, WiMAX). With MMSS, the node can select and hence acquire cdma2000 and non-cdma2000 systems (e.g., LTE, WiMAX) based on carrier's preferences. Specifically, in some wireless communication systems, nodes perform MMSS procedures independently of one another. However, these nodes may experience the same system network conditions as one another due to their close proximity to each other. For example, one node may obtain a first signal quality for a first radio access technology (RAT) with a higher priority compared to a second RAT; while another node may obtain a second signal quality for the second RAT with the lower priority. Nonetheless, these nodes would normally be unable to exchange this information with one another in order to efficiently select systems (e.g., in a scenario where both nodes use signal quality measurements from both the first RAT and the second RAT in making a system selection decision). Moreover, node power is drained linearly as a function of the number of signal quality measurements, so independent MMSS is inefficient.

As such, the present methods and apparatus may determine whether a node is part of a subset of nodes that perform system scans and are permitted to transmit the system scan results to the rest of the set, so that the set of nodes may determine whether to switch from their current RAT to another RAT. Accordingly, in some aspects, the present methods and apparatus may provide an efficient solution, as compared to current solutions, for example, to enable only certain nodes to perform system scans while others do not perform system scans or to distribute the system scans among the set of nodes. Additionally, the present methods and apparatus may provide a mechanism to overcome inefficient independent SSMS among a set of nodes.

FIG. 1 is a diagram illustrating an LTE network architecture 100. The LTE network architecture 100 may be referred to as an Evolved Packet System (EPS) 100. The EPS 100 may include one or more UEs 102, which may include system selection component 720 (FIG. 7) configured to coordinate system selection among a set of nodes. Additionally, EPS 100, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
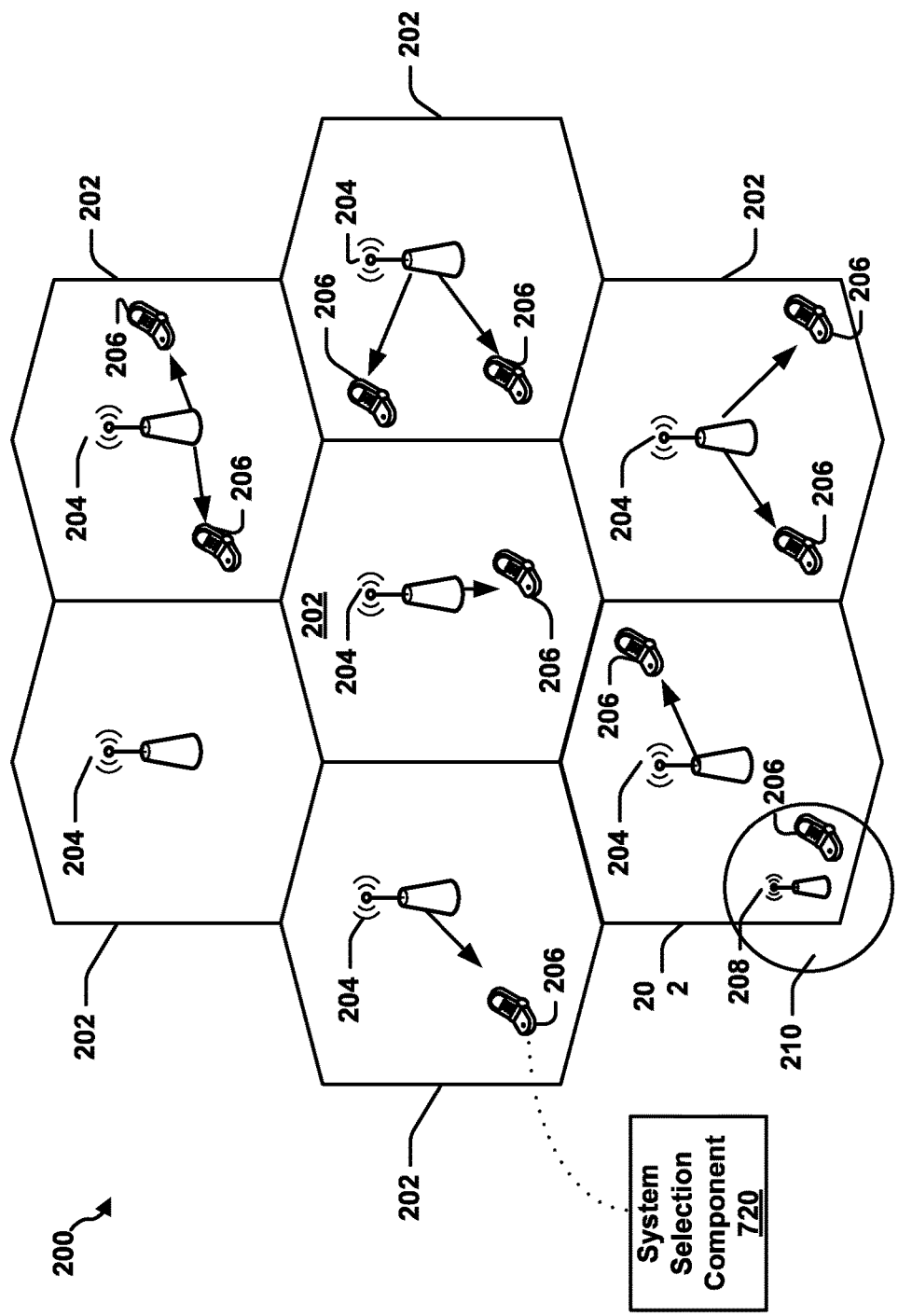
FIG. 2 is a diagram illustrating an example of an access network in according to an aspect of the present disclosure.

FIG. 2 is a diagram illustrating an example of an access network 200 in an LTE network architecture in which one or more of the UEs 206 may include system selection component 720 (FIG. 7), as discussed herein. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations.

These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
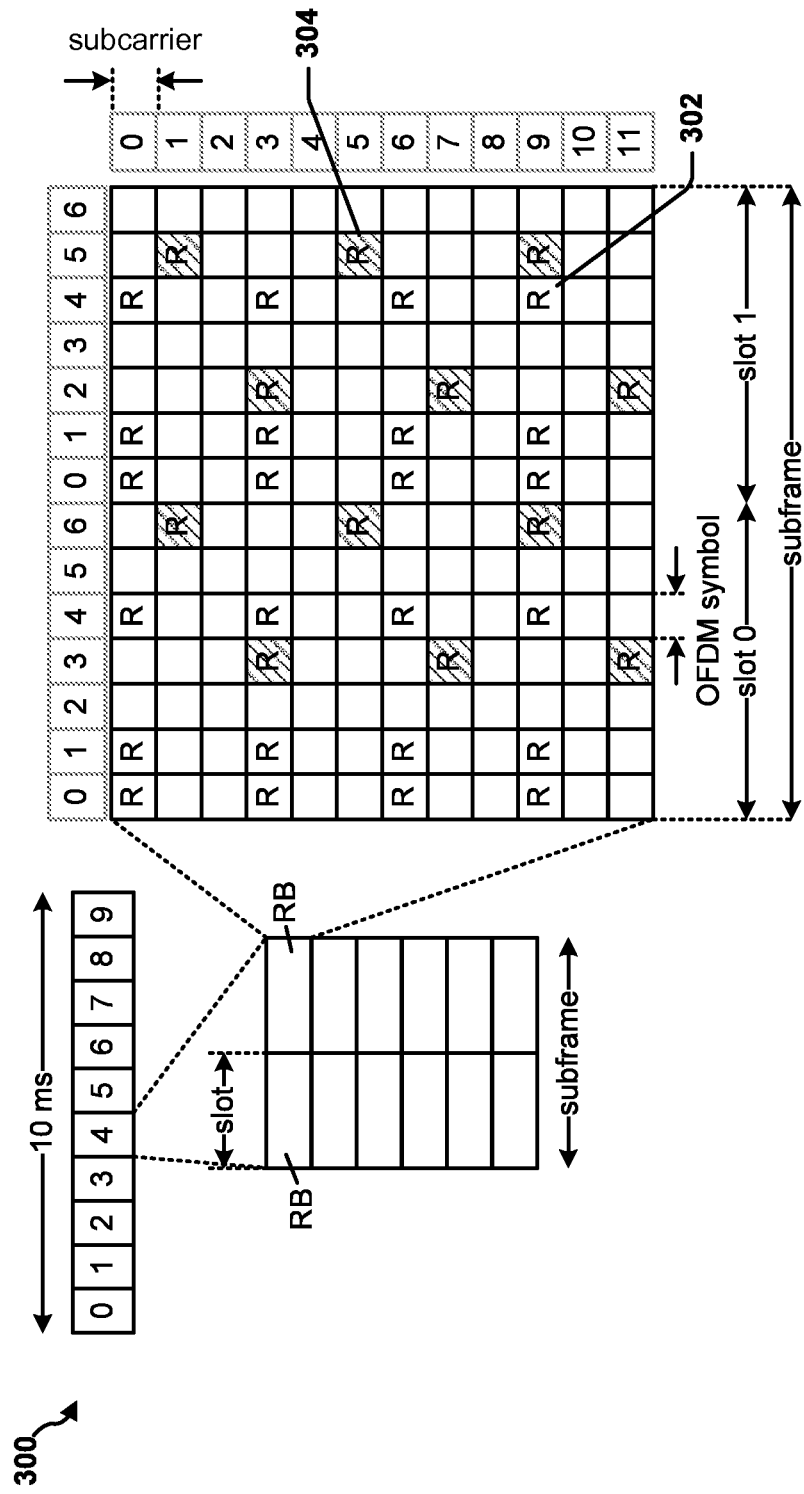
FIG. 3 is a diagram illustrating an example of a downlink (DL) frame structure in LTE in accordance with an aspect of the present disclosure.

FIG. 3 is a diagram 300 illustrating an example of a DL frame structure in LTE, which may be received by a UE, such as UE 702 (FIG. 7) that may include system selection component 720 (FIG. 7), as described herein. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE, such UE 702 of FIG. 7 including system selection component 720, receives and the higher the modulation scheme, the higher the data rate for the UE.

Figure 4:
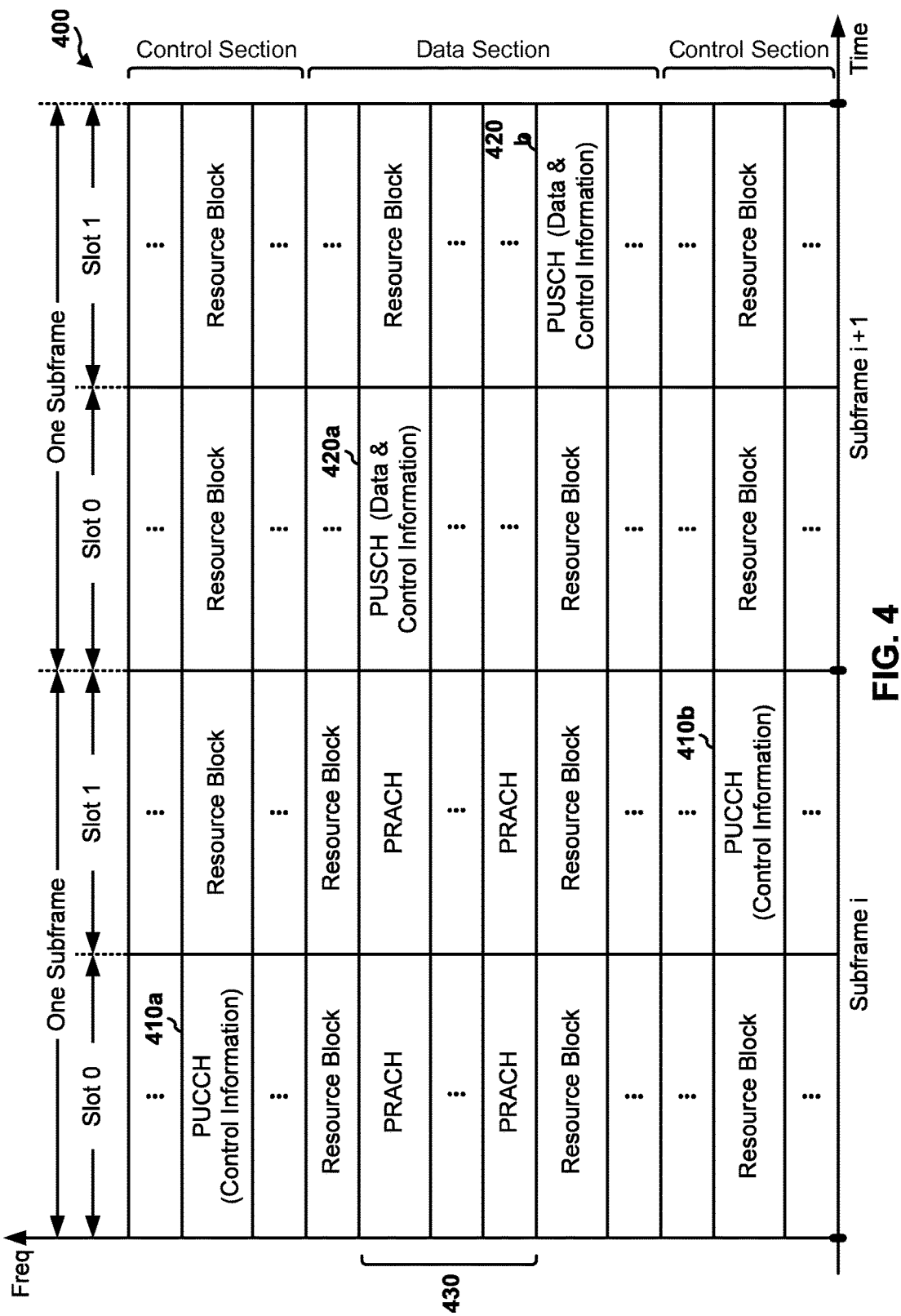
FIG. 4 is a diagram illustrating an example of an UL frame structure in LTE in accordance with an aspect of the present disclosure.

FIG. 4 is a diagram 400 illustrating an example of an UL frame structure in LTE, which may be transmitted by a UE, such as UE 702 (FIG. 7) that may include system selection component 720 (FIG. 7), as described herein. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE, such as UE 702 (FIG. 7) including system selection component 720, may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a sub-frame and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
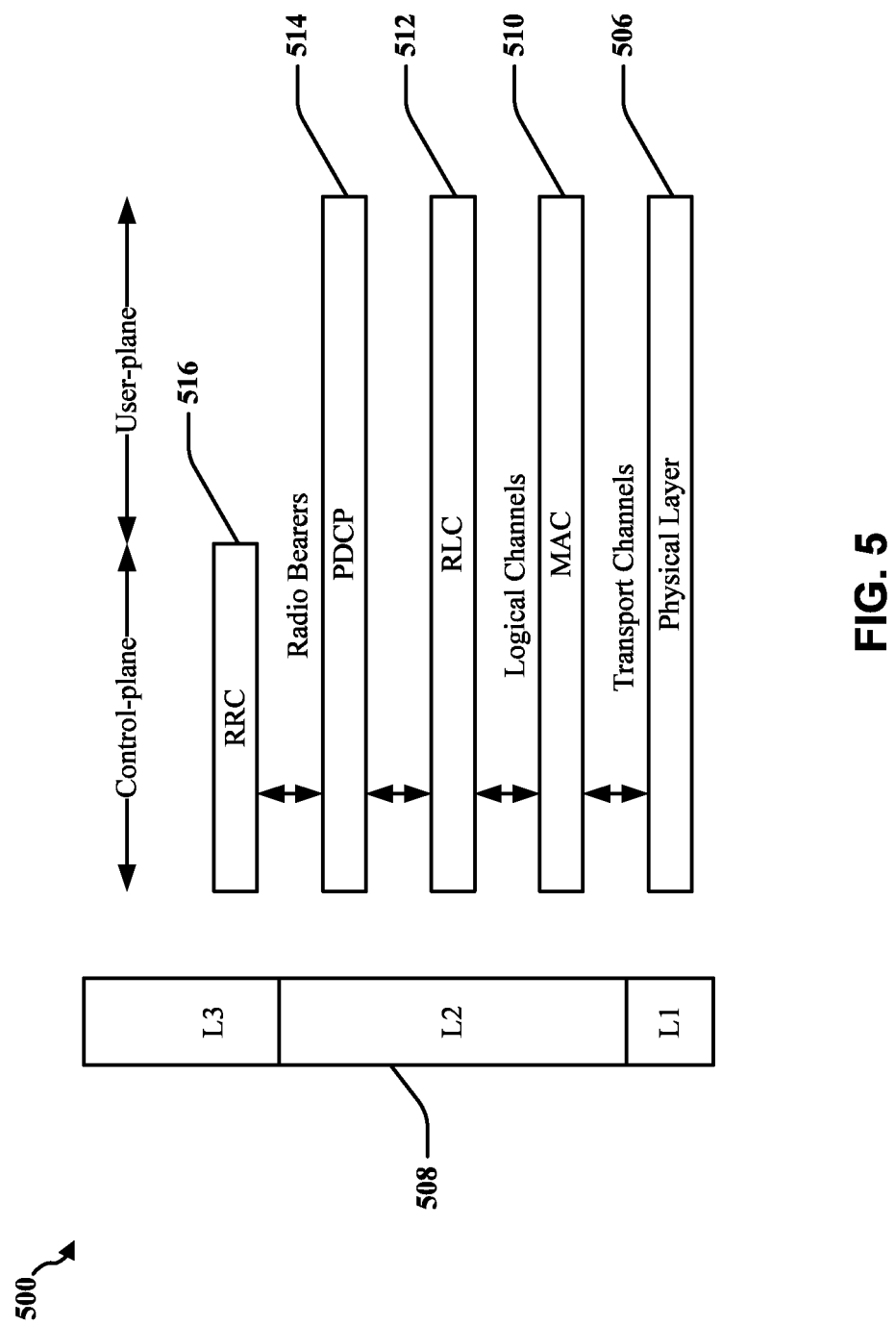
FIG. 5 is a diagram illustrating an example of a radio protocol architecture for the user and control planes in accordance with an aspect of the present disclosure.

FIG. 5 is a diagram 500 illustrating an example of a radio protocol architecture for the user and control planes in LTE. The radio protocol architecture may be used by a UE, such UE 702 (FIG. 7) including system selection component 720, and an eNB, and the radio architecture includes three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
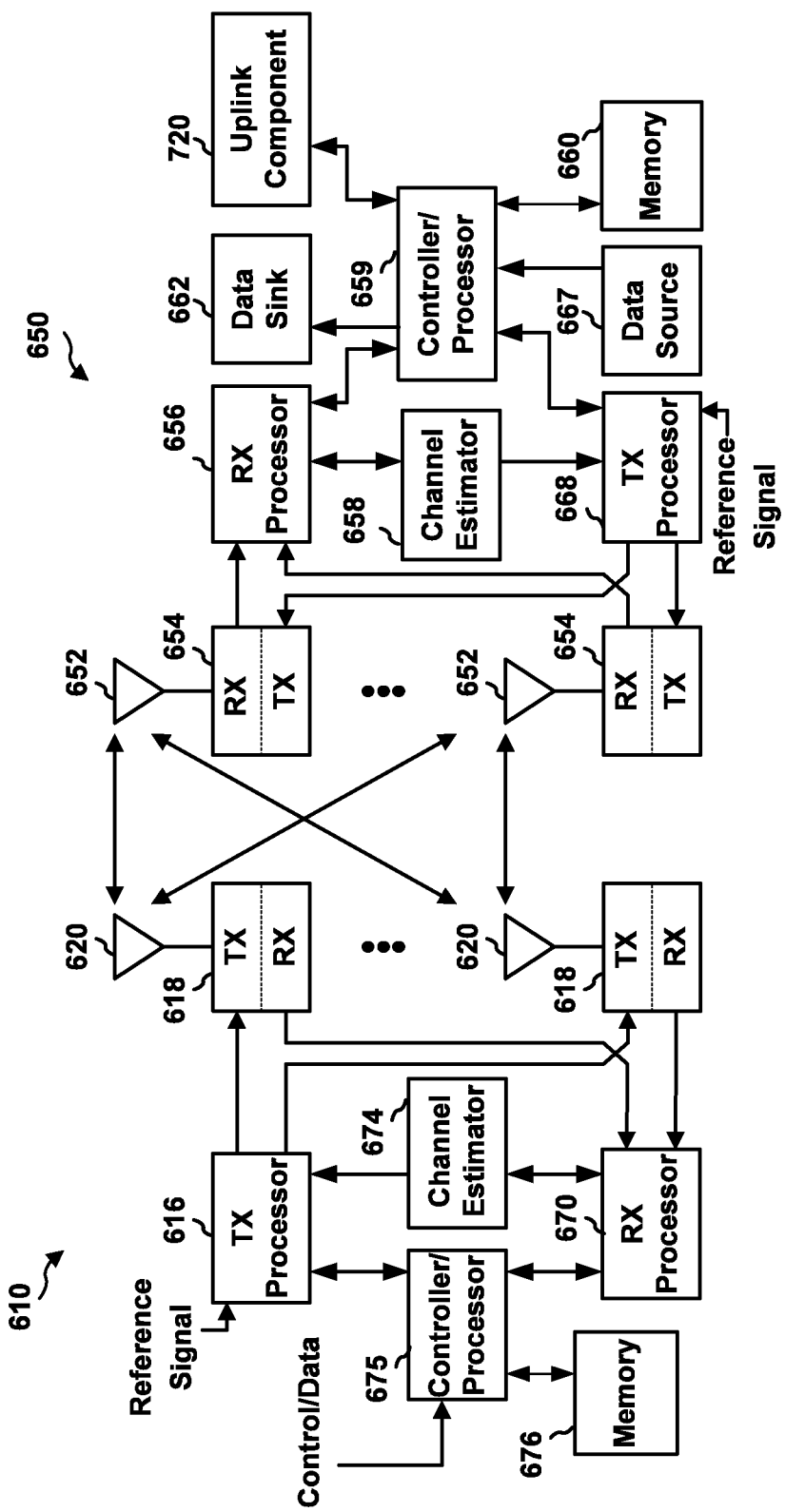
FIG. 6 is a diagram illustrating an example of an evolved Node B and user equipment in an access network in accordance with an aspect of the present disclosure.

FIG. 6 is a block diagram of an eNB 610 in communication with a UE 650 in an access network. UE 650 may be the same or similar as UE 702 including system selection component 720 of FIG. 7. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream.

The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations. For example, some or all of the functionality of system selection component 720 may be implemented in one or more of RX processor 656, controller/processor 659, channel estimator 658, and TX processor 668.

Figure 7:
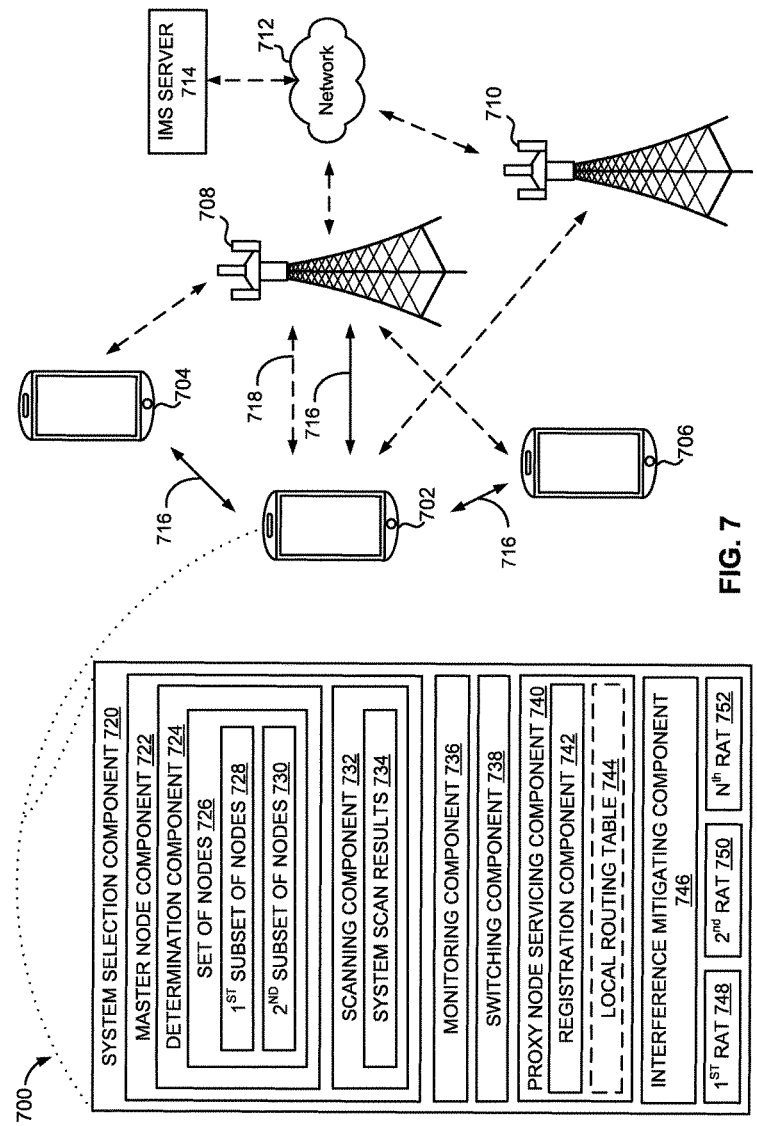
FIG. 7 is a schematic diagram of a communication network including an aspect of a system selection component.

Referring to FIG. 7, in an aspect, a wireless communication system 700 includes at least one UE 702 (also referred to herein as node 702) in communication coverage of at least a first network entity 708 and a second network entity 710. UE 702 may communicate with network 712 via network entity 708. In other aspects, multiple UEs including UE 702, 704, and 706 may be in communication coverage with one or more network entities, including first network entity 708 and second network entity 710. For instance, UE 702 may communicate with network entity 708 using one or more communication channels 716 and/or 718 on one or both of the uplink and downlink. In such aspects, communication channels 716 and/or 718 may utilize or facilitate communication based on one or more radio access technology (RAT) types (e.g., Bluetooth, Wi-Fi, and 3G, 4G and/or LTE). In these aspects, first network entity 708 and second network entity 710, each may operate according to any RAT standard, which may be the same RAT standard or different RAT standards for each of the respective cells. For instance, in one use case that should not be construed as limiting, first network entity 708 may be operating according to one of WCDMA, GSM, LTE, and variants thereof, and second network entity 710 may be operating according to one of WCDMA, GSM, LTE, and variants thereof. Moreover, each network entity (e.g., first network entity 708 and second network entity 710) may operate according to two or more RAT standards, including wireless local area network (WLAN) and wireless wide area network (WWAN).

It should be understood that UE 702 may communicate with one or more cells included or deployed at network entities 708 and 710. In other aspects, first network entity 708 may alternatively be referred to as a cell with which UE 702 maintains an radio resource control (RRC) connected state. Additionally, UE 702 may transmit and/or receive wireless communications to and/or from network entity 708 on the one or more communication channels 716 and/or 718. Further, UE 702 may communicate with network 712 via first network entity 708 and/or second network entity 710. UE 702 may communicate with IP multimedia subsystem (IMS) server 714 located within or in communication with network 712.

In some aspects, UE 702 may also be referred to by those skilled in the art (as well as interchangeably herein) as a node, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, a wireless transmit/receive unit, or some other suitable terminology.

Additionally, network entities 708 and/or 710 may be a macrocell, small cell, picocell, femtocell, access point, relay, Node B, mobile Node B, UE (e.g., communicating in peer-to-peer or ad-hoc mode with UE 702), or substantially any type of component that can communicate with UE 702 to provide wireless network access at the UE 702.

According to the present aspects, UE 702 may include one or more nodes or it may be considered as a node. For example, if UE 702 is able to communicate according to one RAT it may be considered to be or to include one node, or if UE 702 is able to communicate according to two RATs it may be considered to be or to include two nodes (e.g., a first node associated with a first RAT, and a second node associated with a second RAT). As such, for purposes of simplicity, the term UE as used herein will be interpreted as a node. Node 702 may include system selection component 720, which may include various component and/or subcomponents configured to coordinate system selection among a plurality of nodes (e.g., nodes 702, 704, and/or 706). Specifically, system selection component 720 may be configured to determine if node 702 is part of a cooperating set of nodes and should perform system scans, and generate and transmit system scan results, or just monitor for system scan results transmitted by other nodes that are part of the set of nodes. Based on the system scan results, system selection component 720 may be configured to determine whether to perform a system selection procedure to switch from its current RAT to another RAT. As such, system selection component 720 enables efficient multi-mode system selection (MMSS) among the plurality of nodes 702, 704, and/or 706 in order to reduce power and system acquisition times. As used herein, MMSS refers to selecting between a plurality of different RATs, where each of the different RATs may be considered a different mode.

In an aspect, system selection component 720 may include master node component 722, which may be configured to determine that a node (e.g., nodes 702, 704, and/or 706) is part of a subset of nodes, and performs one or more system scans on one or more RATs (e.g., $1^{st}$ RAT 748, $2^{nd}$ RAT 750, and/or $N^{th}$ RAT 752). For example, when the node is part of a subset of nodes authorized to perform scans it is referred to as a master node and when the node is part of a subset of nodes prohibited from performing scans it is not referred to as a master node. Specifically, master node component 722 may be configured to either allow or prohibit a node from performing system scans based on one or more characteristics. By prohibiting a subset of nodes from performing system scans, master node component 722 is capable of reducing the power and system acquisition times required for system selection.

In such aspects, master node component 722 may include determination component 724, which may be configured to determine whether a node (e.g., node 702) is part of a subset of nodes (e.g., $1^{st}$ subset of nodes 728) permitted to perform one or more system scans for a set of nodes 726 that includes the $1^{st}$ subset of nodes 728 and $2^{nd}$ subset of nodes 730. Conversely, determination component 724 is configured to determine whether a node (e.g., node 702) is part of a subset of nodes (e.g., $2^{nd}$ subset of nodes 730) prohibited from performing one or more system scans.

In some aspects, determination component 724 may be configured to make the determinations whether a node (e.g., node 702) is part of a subset of nodes (e.g., $1^{st}$ subset of nodes 728) permitted to perform one or more system scans for a set of nodes 726 based at least in part on one or more characteristics of node 702. In some instances, the one or more characteristics may include one or more RAT similarities with the nodes (e.g., nodes 702, 704, and/or 706) in the set of nodes 726, an amount of power consumed per system scan per RAT (e.g., $1^{st}$ RAT 748, $2^{nd}$ RAT, and/or $N^{th}$ RAT 752), whether node 702 is in a connected state, and/or whether node 702 has voice capabilities. In certain instances, the $1^{st}$ subset of nodes 728 comprises one or more nodes that minimize an amount of power consumed per system scan per RAT for the set of nodes 726. In an instance, for example, RAT similarities may correspond to nodes that voice centric, such as, but not limited to, voice over packet switching (PS) session (VoPS) capability. Further, in another instance, for example, if the power consumed to perform system scans differs across multiple nodes, then the node that consumes the least amount of power per system scan per RAT may be determined to perform one or more system scans for a set of nodes 726. In a further instance, for example, a node that is not in a connected state may be determined to perform one or more system scans for a set of nodes 726. In an aspect, a combination of one or more characteristics may be used to determine whether a node (e.g., node 702) is part of a subset of nodes (e.g., $1^{st}$ subset of nodes 728) permitted to perform one or more system scans for a set of nodes 726.

For instance, set of nodes 726 may include nodes that are voice-centric (e.g., $1^{st}$ set of nodes 728) and may be interested in sharing information (e.g., system scan results 734) only with other nodes that are voice centric (e.g., $2^{nd}$ set of nodes 730) due to the nodes sharing RAT similarities of being voice centric. In certain instances, voice-centric capabilities may include VoPS capability of an LTE timing advance (TA) or Service Specific Access Control Multimedia Telephony (SSACMMTEL) advertised in Session Initiation Block (SIB) 2 in LTE. MMTEL is a global standard based on the IP Multimedia Subsystem (IMS), offering converged, fixed and mobile real-time multimedia communication using the media capabilities such as voice, real-time video, text, file transfer and sharing of pictures, audio and video clips. With MMTEL, users have the capability to add and drop media during a session. SSAC is used to apply independent access control for telephony services (e.g., MMTEL) for mobile originating session requests from idle-mode. In another example, determination component 724 may be configured to determine that nodes which consume the least amount of power per system scan per RAT and that are not in a connected state belong in the $1^{st}$ set of nodes 728. As such, the node that consumes the least amount of power and is in idle mode is chosen since it is the node that may most efficiently perform one or more system scans.

Further, master node component 722 may include scanning component 732, which may be configured to perform one or more system scans on one or more RATs (e.g., $1^{st}$ RAT 748, $2^{nd}$ RAT, and/or $N^{th}$ RAT 752) of node 702. In some instances, scanning component 732 may be configured to perform the one or more system scans in response to the determination component 724 determining that node 702 is part of the $1^{st}$ subset of nodes 728. In other instances, performing the one or more system scans comprises performing a parallel system scan for a $1^{st}$ RAT 748, wherein each node in the $1^{st}$ subset of nodes 728 performs the parallel system scan for a respective RAT (e.g., $1^{st}$ RAT 748, $2^{nd}$ RAT, and/or $N^{th}$ RAT 752). Once performed, scanning component 732 may be configured to obtain one or more system scan results 734 on the one or more RATs (e.g., $1^{st}$ RAT 748, $2^{nd}$ RAT, and/or $N^{th}$ RAT 752). In certain instances, system scan results 734 may comprise RAT signal quality information, such as but not limited to, signal quality levels (dB).

As such, system selection component 720 may also be configured to transmit the one or more system scan results 734 to the other nodes in the $1^{st}$ set of nodes 728 and the $2^{nd}$ set of nodes 730. In some instances, system selection component 720 may transmit the one or more system scan results 734 via peer-to-peer (P2P) connectivity between node 702 and the nodes in the set of nodes 726 (e.g., nodes 704 and/or 706). In certain aspects, P2P connectivity (e.g., communication channel 716) may comprise connectivity via one or more of Bluetooth, wireless local area network (WLAN), wireless wide area network (WWAN), WiFi, LTE, and D-bus.

In other instances, if all the nodes in the set of nodes 726 cannot reach each other via P2P connectivity, then an ad hoc network may be used to connect the nodes in the set of nodes 726 via communication channels 718. In certain aspects, dominating sets based on spectral efficiency may be used to set up multicast trees between the set of nodes 726. The reason for identifying the dominating sets is because the nodes in those sets are likely to be used as master nodes. Moreover, in instances where the set of nodes 726 are collocated (e.g., connected on the same hardware or where two nodes are in such proximity of each other that may be considered to be collocated) then one or more techniques may be used to share the system scan results 734 such as use of shared memory, use of software inter-process communication (IPC), and/or P2P interfaces (e.g., D-bus, AllJoyn, etc.).

In additional aspects, system selection component 720 may include monitoring component 736, which may be configured to monitor for one or more system scan results 734 transmitted by one or more nodes (e.g., 704 and/or 706) that are determined to be part of the $1^{st}$ subset of nodes 728. For instance, monitoring component 736 may receive one or more system scan results 734 via P2P communications (e.g., communication channels 716) from the $1^{st}$ set of nodes 728 (e.g., nodes 704 and 706). In some instances, monitoring component 736 may be configured to monitor for one or more system scan results 734 regardless of whether node 702 is determined to be part of the $1^{st}$ set of nodes or the $2^{nd}$ set of nodes. As such, system selection component 720 may be configured to receive the one or more system scan results 734, as described above.

Specifically, in one aspect, system selection component 720 may include switching component 738, which may be configured to determine whether node 702 should switch from its current RAT (e.g., $1^{st}$ RAT 748) to another RAT (e.g., $2^{nd}$ RAT and/or $N^{th}$ RAT 752), and switch RATs based on the determination. In some instances, switching component 738 may be configured to make its determination based at least in part on the one or more system scan results 734 obtained by scanning component 732 and received from nodes that are part of the $1^{st}$ set of nodes 728. In further instances, switching from the current RAT (e.g., $1^{st}$ RAT 748) to another RAT (e.g., $2^{nd}$ RAT and/or $N^{th}$ RAT 752) comprises one or more of disabling the current RAT (e.g., $1^{st}$ RAT 748), preventing a timing association of an associated Public Land Mobile Network (PLMN) for the current RAT (e.g., $1^{st}$ RAT 748), and forbidding a PLMN identification (ID) for the current RAT (e.g., $1^{st}$ RAT 748). In certain aspects, switching RATs may comprise one or more of disabling LTE, preventing a tracking area of an associated Equivalent Home Public Land Mobile Network (EHPLMN) or (HPLMN), and preventing a PLMN identification (ID) when the PLMN-ID is not for an EHPLMN or HPLMN. HPLMN is a PLMN where the mobile country code (MCC) and mobile network code (MNC) of the PLMN identity match the MCC and MNC of the IMSI. To allow provision for multiple HPLMN codes, PLMN codes that are present within this list shall replace the HPLMN code derived from the IMSI for PLMN selection purposes. This list is stored on the USIM and is known as the EHPLMN list. The EHPLMN list may also contain the HPLMN code derived from the IMSI. If the HPLMN code derived from the IMSI is not present in the EHPLMN list then it shall be treated as a Visited PLMN for PLMN selection purposes. Any of the PLMN entries contained in the Equivalent HPLMN list.

For example, switching component 738 may obtain the system scan results 734 from scanning component 732. For instance, the system scan results 734 may state that a node 702 experiences adequate signal quality on a lower priority RAT (e.g., $2^{nd}$ RAT 750 and/or $N^{th}$ RAT 752), and node 702 or another node in the $1^{st}$ set of nodes 728 (e.g., nodes 704 and/or 706) experiences poor signal quality on a higher priority RAT (e.g., $1^{st}$ RAT 748). However, due to current 3GPP procedures (or 3GPP2/MMSS procedures), node 702 or another node in the $1^{st}$ set of nodes 728 (e.g., nodes 704 and/or 706) may be prohibited from leaving the current RAT (e.g., $1^{st}$ RAT 748) due to its higher priority. Nonetheless, switching component 738 may be configured to switch from $1^{st}$ RAT 748 to $2^{nd}$ RAT 750 and/or $N^{th}$ RAT 752 based on the system scan results 734 by disabling LTE capability and/or forbidding the specific tracking area of the associated EHPLMN or HPLMN or forbidding the entire PLMNID if it is not EHPLMN and/or HPLMN. In some instances, P2P connectivity may have a cost defined in terms of power. If the power consumption due to P2P connectivity exceeds the savings accrued by virtue of reduced scans per node, then the P2P connectivity can be re-defined to ensure it is between a fewer set of nodes 726 that may comprise fewer nodes.

As such, in some aspects, system selection component 720 may include proxy node servicing component 740, which may be configured to execute registration component 742 to register node 702 with IMS server 714, located within network 712, in order to receive one or more incoming calls from a proxy node. In some instances, nodes within the set of nodes 726 may support similar RAT capabilities and may be configured to conserve power, so proxy node servicing component 740 may be configured to execute registration component 742 to register node 702 with IMS server 714.

As such, system selection component 720 may be configured to receive the one or more incoming calls routed from the proxy node in response to registering with IMS server 714. For instance, if an incoming call occurs, the proxy node will reroute the incoming call to node 702 based on local routing table configurations comprising the registered nodes' Session Initiation Protocol (SIP) uniform resource identifiers (URIs) and corresponding node identification (ID). For example, node IDs may include, but are not limited to, international mobile subscriber identity (IMSI) and IP addresses of the registered node.

In further aspects, node 702 may be configured to be the proxy node. As a result, proxy node servicing component 740 may be configured to optionally include local routing table 744. In such instances, local routing table 744 may be configured to include the registered nodes' Session Initiation Protocol (SIP) uniform resource identifiers (URIs) and corresponding node identification (ID). For example, node IDs may include, but are not limited to, international mobile subscriber identity (IMSI) and IP addresses of the registered node.

In other aspects, system selection component 720 may include interference mitigating component 746, which may be configured to determine that node 702 is within a threshold proximity with one or more nodes (e.g., nodes 704 and/or 706) of the set of nodes 726. For example, two nodes in a same small form factor device may be considered to be collocated. As a result of being within the threshold proximity the one or more nodes (e.g., nodes 704 and/or 706) of the set of nodes 726 causes interference when contemporaneously in communication with the one or more RATs (e.g., $1^{st}$ RAT 748, $2^{nd}$ RAT, and/or $N^{th}$ RAT 752) of node 702. As a result of the determination, interference mitigating component 746 may be configured to choose a frequency of the one or more RATs (e.g., $1^{st}$ RAT 748, $2^{nd}$ RAT, and/or $N^{th}$ RAT 752) based on one or more channels that cause a least amount of interference between node 702 and the one or more nodes (e.g., nodes 704 and/or 706) of the set of nodes 726.

Additionally, system selection component 720 may be configured to share network information, wherein the network information comprises information regarding at least one or both of connection successes and failures that occurred with the one or more RATs (e.g., $1^{st}$ RAT 748, $2^{nd}$ RAT, and/or $N^{th}$ RAT 752), and throughput received on the one or more RATs (e.g., $1^{st}$ RAT 748, $2^{nd}$ RAT, and/or $N^{th}$ RAT 752). In some instances, any node within the set of nodes 726 may be configured to share network information with other nodes within the set of nodes 726. In other instances, sharing of the network information may be limited to be performed only by the $1^{st}$ set of nodes 728. For example, the network information may comprise one or more of information regarding whether a node was able to successfully attached, and discover the TA as VoPS capable or circuit switched fallback (CSFB) capable, whether all nodes are in limited service so that only one node could be used to perform system scans for available systems, whether a node encounters a LTE network as a forbidden PLMNID that is not specific to its Universal Subscriber Identity Module (USIM) subscription or forbidden TAs/LAs, whether a node requires WLAN service but is unable to connect to an evolved packet data gateway (ePDG) due to the ePDG being unreachable because of an error, and/or whether a node determines that IMS server 714 is unreachable. Sharing of network information may allow nodes within the set of nodes 726 to adjust their system selection procedures accordingly.

Figure 8:
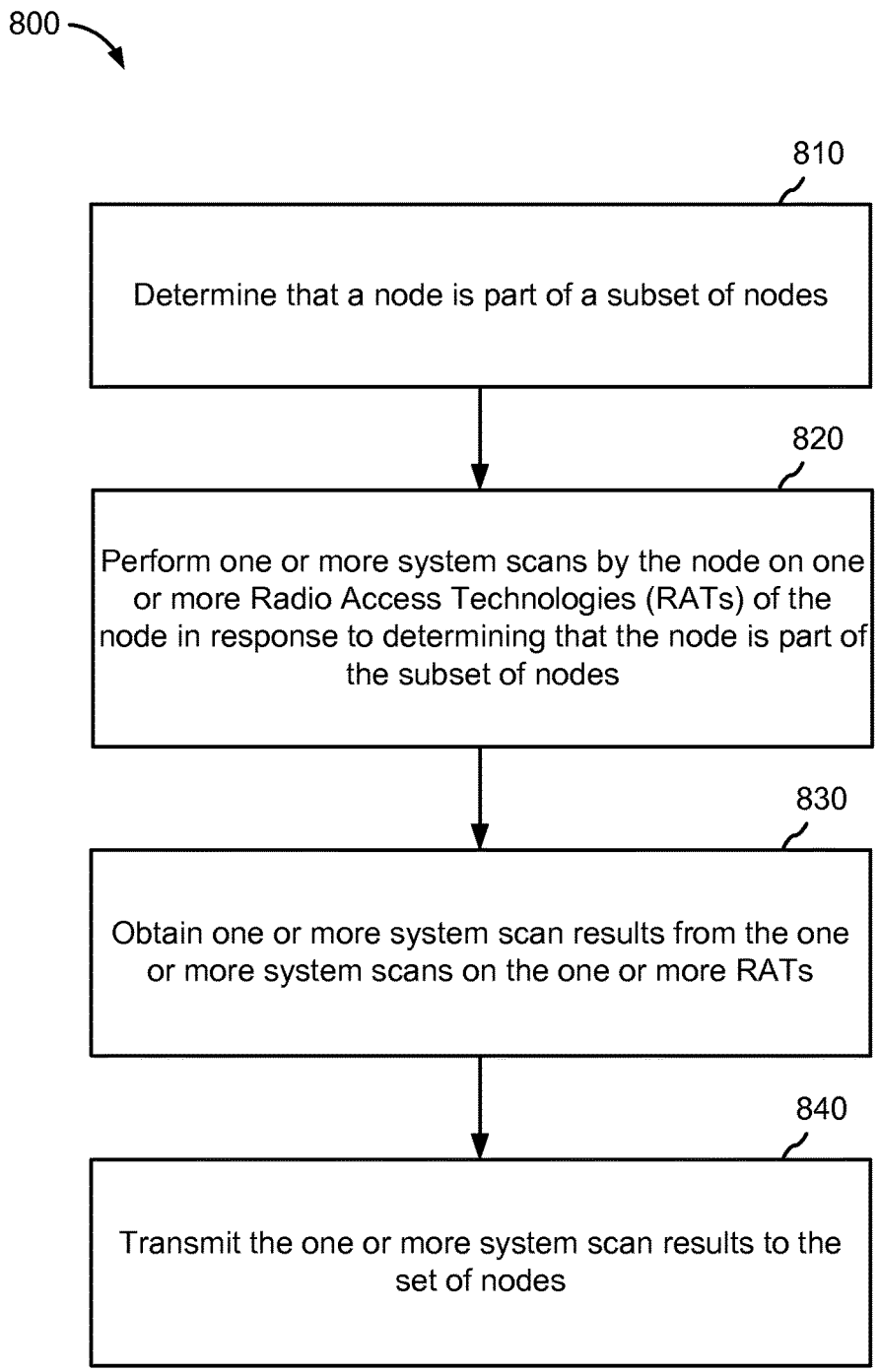
FIG. 8 is a flow chart of an aspect of the system selection features according to an aspect of the present disclosure, e.g., FIG. 7.
Figure 9:
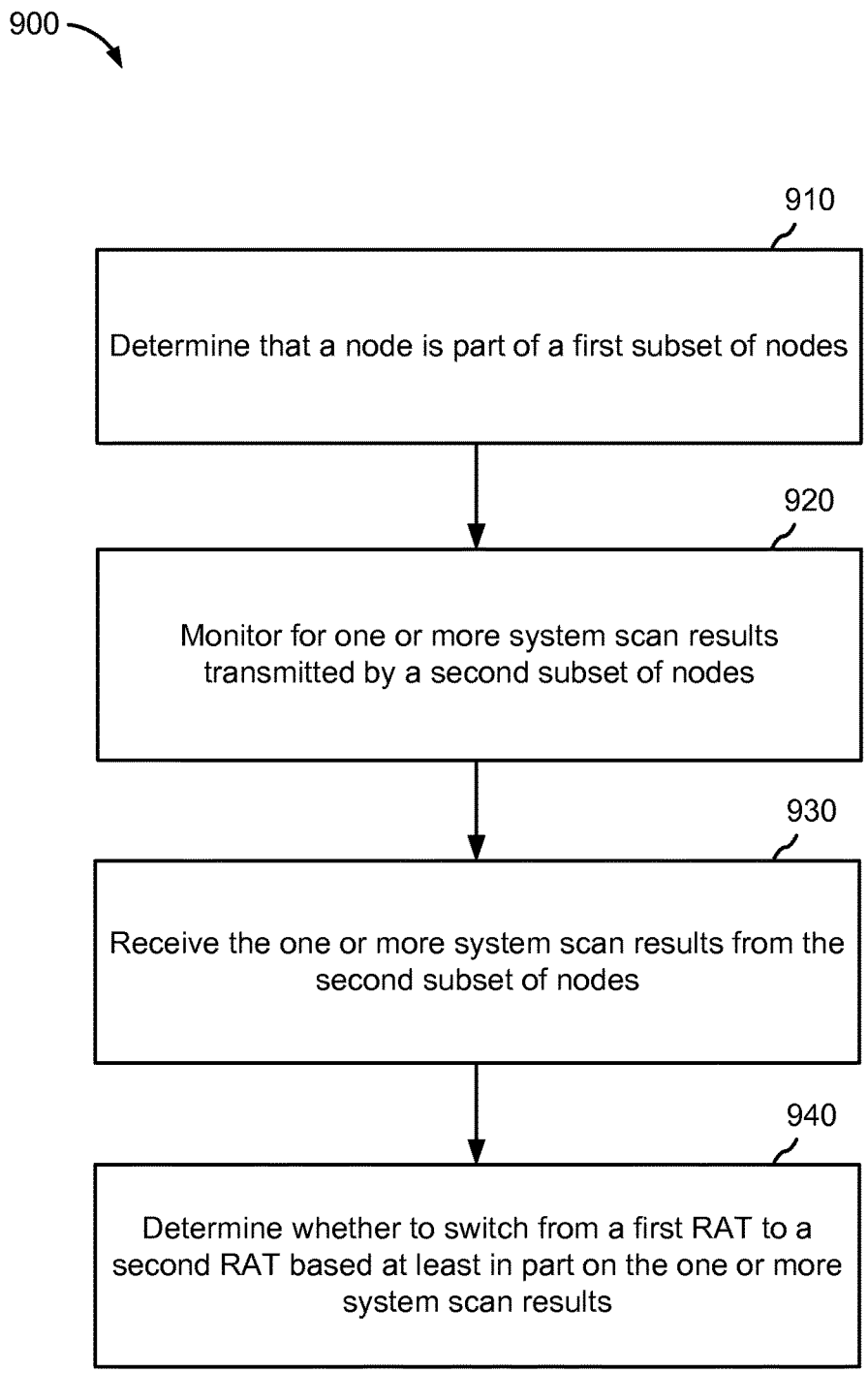
FIG. 9 is a flow chart of another aspect of the system selection features according to an aspect of the present disclosure, e.g., FIG. 7.

Referring to FIGS. 8 and 9, the methods are shown and described as a series of acts for purposes of simplicity of explanation. However, it is to be understood and appreciated that the methods (and further methods related thereto) are not limited by the order of acts, as some acts may, in accordance with one or more aspects, occur in different orders and/or concurrently with other acts from that shown and described herein. For example, it is to be appreciated that the methods may alternatively be represented as a series of interrelated states or events, such as in a state diagram. Moreover, not all illustrated acts may be required to implement a method in accordance with one or more features described herein.

Referring to FIG. 8, in an operational aspect, a node such as node 702 (FIG. 7) may perform one aspect of a method 800 for coordinating system selection among a plurality of nodes. In an aspect, method 800 includes steps to be performed by a node, such as node 702 (FIG. 7), designated as a master node and determined to be authorized to perform system scans.

In an aspect, at block 810, method 800 may include determining that a node is part of a subset of nodes. For example, as described herein, system selection component 720 (FIG. 7) may executed master node component 722 and/or determination component 724 to determine that node 702 is part of a $1^{st}$ subset of nodes 728, wherein each node in the $1^{st}$ subset of nodes 728 performs one or more system scans for a set of nodes 726 that includes the $1^{st}$ subset of nodes 728 and $2^{nd}$ subset of nodes 730. In some instances, node 702 is determined to be part of the $1^{st}$ subset of nodes 728 based at least in part on one or more characteristics of node 702. In some instances, the one or more characteristics may include one or more RAT similarities with the nodes (e.g., nodes 702, 704, and/or 706) in the set of nodes 726, an amount of power consumed per system scan per RAT (e.g., $1^{st}$ RAT 748, $2^{nd}$ RAT, and/or $N^{th}$ RAT 752), whether node 702 is in a connected state, and/or whether node 702 has voice capabilities. For example, when the node 702 is part of a subset of nodes authorized to perform scans it is referred to as a master node. Specifically, master node component 722 and/or determination component 724 may be configured to either allow or prohibit a node from performing system scans based on one or more characteristics. By prohibiting a subset of nodes from performing system scans, master node component 722 and/or determination component 724 is capable of reducing the power and system acquisition times required for system selection.

Further, at block 820, method 800 may include performing the one or more system scans by the node on one or more RATs of the node in response to determining that the node is part of the subset of nodes. For example, when the node is part of a subset of nodes authorized to perform scans it is referred to as a master node and when the node is part of a subset of nodes prohibited from performing scans it is not referred to as a master node. For instance, as described herein, system selection component 720 (FIG. 7) may execute master node component 722 (FIG. 7) and/or scanning component 732 to perform the one or more system scans by node 702 on one or more RATs (e.g., $1^{st}$ RAT 748, $2^{nd}$ RAT, and/or $N^{th}$ RAT 752) of node 702 in response to determining that node 702 is part of the 1st subset of nodes 728. In other instances, performing the one or more system scans comprises performing a parallel system scan for a $1^{st}$ RAT 748, wherein each node in the $1^{st}$ subset of nodes 728 performs the parallel system scan for a respective RAT (e.g., $1^{st}$ RAT 748, $2^{nd}$ RAT, and/or $N^{th}$ RAT 752).

At block 830, method 800 may include obtaining one or more system scan results from the one or more system scans on the one or more RATs. For example, as described herein, system selection component 720 (FIG. 7) may be executed to obtaining one or more system scan results 734 from the one or more system scans on the one or more RATs (e.g., $1^{st}$ RAT 748, $2^{nd}$ RAT, and/or $N^{th}$ RAT 752). In certain instances, system scan results 734 may comprise RAT signal quality information, such as but not limited to, signal quality levels (dB).

At block 840, method 800 may include transmitting the one or more system scan results to the set of nodes. For example, as described herein, system selection component 720 (FIG. 7) may be executed to transmit the one or more system scan results 734 to the set of nodes 726, wherein each node in the set of nodes 726 is configured to determine whether to switch from a $1^{st}$ RAT 748 to a $2^{nd}$ RAT 750 (or $N^{th}$ RAT 752) based at least in part on the one or more system scan results 734. That is, a master node that performs scans may be configured to transmit the scan results to other nodes that do not perform scans. In some instances, system selection component 720 may transmit the one or more system scan results 734 via peer-to-peer (P2P) connectivity between node 702 and the nodes in the set of nodes 726 (e.g., nodes 704 and/or 706). In certain aspects, P2P connectivity (e.g., communication channel 716) may comprise connectivity via one or more of Bluetooth, wireless local area network (WLAN), wireless wide area network (WWAN), WiFi, LTE, and D-bus.

Referring to FIG. 9, in an additional and/or alternate operational aspect, a node such as node 702 (FIG. 7) may perform one aspect of a method 900 sending a PDU including a compression indication to coordinating system selection among a plurality of nodes. It should be understood that any one or more of the various component and/or subcomponents of system selection component 720 (FIG. 7) may be executed to perform the aspects described herein with respect to each block forming method 900. In an aspect, method 900 includes steps to be performed by a node, such as node 702 (FIG. 7), designated not as a master node and determined to not be authorized to perform system scans.

In an aspect, at block 910, method 900 may include determining that a node is part of a first subset of nodes. That is, when the node is part of a subset of nodes authorized to perform scans it is referred to as a master node and when the node is part of a subset of nodes prohibited from performing system scans it is not referred to as a master node. For example, as described herein, system selection component 720 (FIG. 7) may execute master node component 722 and/or determination component 724 to determine that node 702 is part of $2^{nd}$ subset of nodes 730, wherein each node in the $2^{nd}$ subset of nodes 730 is prohibited from performing one or more system scans for a set of nodes 726 that includes the $1^{st}$ subset of nodes 728 and $2^{nd}$ subset of nodes 730. In some instances, node 702 is determined to be part of the $2^{nd}$ subset of nodes 730 based at least in part on one or more characteristics of node 702. In some instances, the one or more characteristics may include one or more RAT similarities with the nodes (e.g., nodes 702, 704, and/or 706) in the set of nodes 726, an amount of power consumed per system scan per RAT (e.g., $1^{st}$ RAT 748, $2^{nd}$ RAT, and/or $N^{th}$ RAT 752), whether node 702 is in a connected state, and/or whether node 702 has voice capabilities. Here, node 702 is not considered to be a master node, so it is prohibited from performing system scans.

Additionally, at block 920, method 900 may include monitoring for one or more system scan results transmitted by a second subset of nodes. For instance, as described herein, system selection component 720 (FIG. 7) may be configured to execute monitoring component 736 (FIG. 7) to monitor for one or more system scan results 734 transmitted by $1^{st}$ subset of nodes 728, wherein each node in the $1^{st}$ subset of nodes 728 performs one or more system scans for a set of nodes 726. Thus, node 702 monitors for system scan results 734 from one or more master nodes.

Method 900 may proceed to block 930 and include receiving the one or more system scan results from the second subset of nodes. Specifically, as described herein, system selection component 720 (FIG. 7) may be configured to receive the one or more system scan results 734 from the $1^{st}$ subset of nodes 728. For instance, monitoring component 736 may receive one or more system scan results 734 via P2P communications (e.g., communication channels 716) from the $1^{st}$ set of nodes 728 (e.g., nodes 704 and 706).

At block 940, method 900 may include determining whether to switch from a first RAT to a second RAT based at least in part on the one or more system scan results. For instance, as described herein, system selection component 720 (FIG. 7) may execute switching component 738 (FIG. 7) to determine whether to switch from a $1^{st}$ RAT 748 to a $2^{nd}$ RAT 750 (or $N^{th}$ RAT 752) based at least in part on the one or more system scan results 734. In further instances, switching from the current RAT (e.g., $1^{st}$ RAT 748) to another RAT (e.g., $2^{nd}$ RAT and/or $N^{th}$ RAT 752) comprises one or more of disabling the current RAT (e.g., $1^{st}$ RAT 748), preventing a timing association of an associated Public Land Mobile Network (PLMN) for the current RAT (e.g., $1^{st}$ RAT 748), and forbidding a PLMN identification (ID) for the current RAT (e.g., $1^{st}$ RAT 748). In certain aspects, switching RATs may comprise one or more of disabling LTE, preventing a tracking area of an associated Equivalent Home Public Land Mobile Network (EHPLMN) or (HPLMN), and preventing a PLMN identification (ID) when the PLMN-ID is not for an EHPLMN or HPLMN. For example, switching component 738 may obtain the system scan results 734 from scanning component 732. The system scan results 734 may state that a node 702 experiences adequate signal quality on a lower priority RAT (e.g., $2^{nd}$ RAT 750 and/or $N^{th}$ RAT 752), and node 702 or another node in the $1^{st}$ set of nodes 728 (e.g., nodes 704 and/or 706) experiences poor signal quality on a higher priority RAT (e.g., $1^{st}$ RAT 748). However, due to current 3GPP procedures (or 3GPP2/MMSS procedures), node 702 or another node in the $1^{st}$ set of nodes 728 (e.g., nodes 704 and/or 706) may be prohibited from leaving the current RAT (e.g., $1^{st}$ RAT 748) due to its higher priority. Nonetheless, switching component 738 may be configured to switch from $1^{st}$ RAT 748 to $2^{nd}$ RAT 750 and/or $N^{th}$ RAT 752 based on the system scan results 734. In some instances, P2P connectivity may have a cost defined in terms of power. If the power consumption due to P2P connectivity exceeds the savings accrued by virtue of reduced scans per node, then the P2P connectivity can be re-defined to ensure it is between a fewer set of nodes 726 that may comprise fewer nodes.

Figure 10:
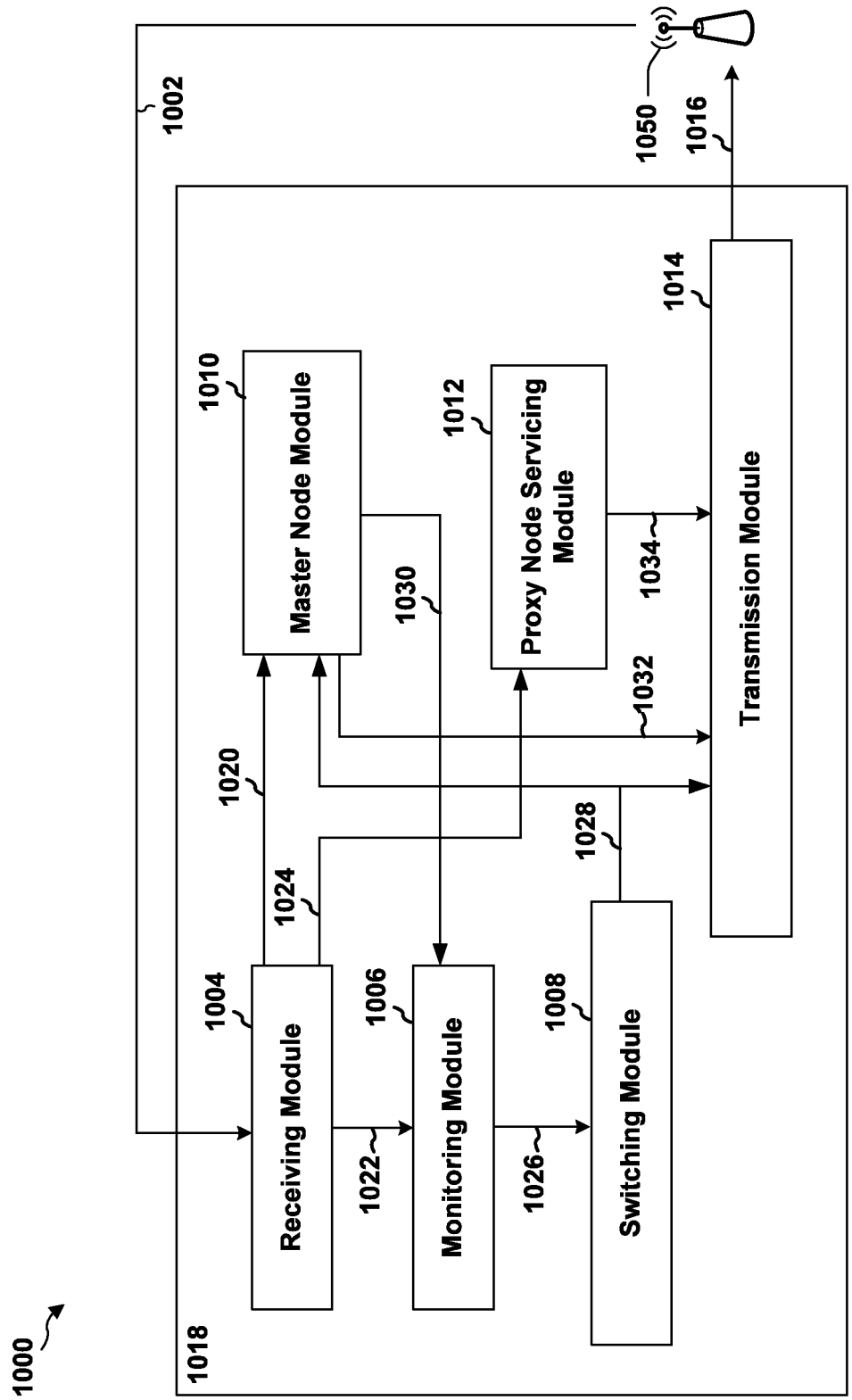
FIG. 10 is a conceptual data flow diagram illustrating the data flow between different modules/means/components in an example apparatus according to an aspect of the present disclosure, e.g., FIG. 7.

Referring to FIG. 10, data flow 1000 illustrates an example flow between different modules/means/components in an example apparatus 1018 according to an aspect of the present disclosure. The apparatus may be a node, such as a UE or node 702 including system selection component 720 of FIG. 7. Apparatus 1018 includes receiving module 1004 for receiving wireless information 1002 including system scan results from network entity 1050 that lends in determining whether the network entity 1050 support the system selection procedure associated with the apparatus 1018. Further, Apparatus 1018 may include data monitoring module 1006 for monitoring and receiving system scan result information 1022 from network entity 1050.

Additionally, apparatus 1018 may include switching module 1008 for determining whether the network entity 1050 should switch from a $1^{st}$ RAT to a $2^{nd}$ RAT based at least in part on the one or more system scan results and transmitting an indication 1028 based on the foregoing determination. Apparatus 1018 may further include master node module 1010 for determining whether the apparatus 1018 is a part of a 1$^{st}$ subset of nodes or 2$^{nd}$ subset of nodes and transmitting an indication 1030. Master node module 1010 may also transmit indication 1032 to perform system scans. In further aspects, proxy node servicing module 1012 may receive incoming call 1024 or perform registration of apparatus 1018 with an IMS server (such as IMS server 714 in FIG. 7) by indication 1034. Moreover, transmission module 1014 may send/transmit one or more communications 1016 to one or more network entities, including network entity 1050.

The apparatus may include additional modules that perform each of the steps of the algorithm in the aforementioned flow diagram of FIG. 10. As such, each step in the aforementioned flow diagram of FIG. 10 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 11:
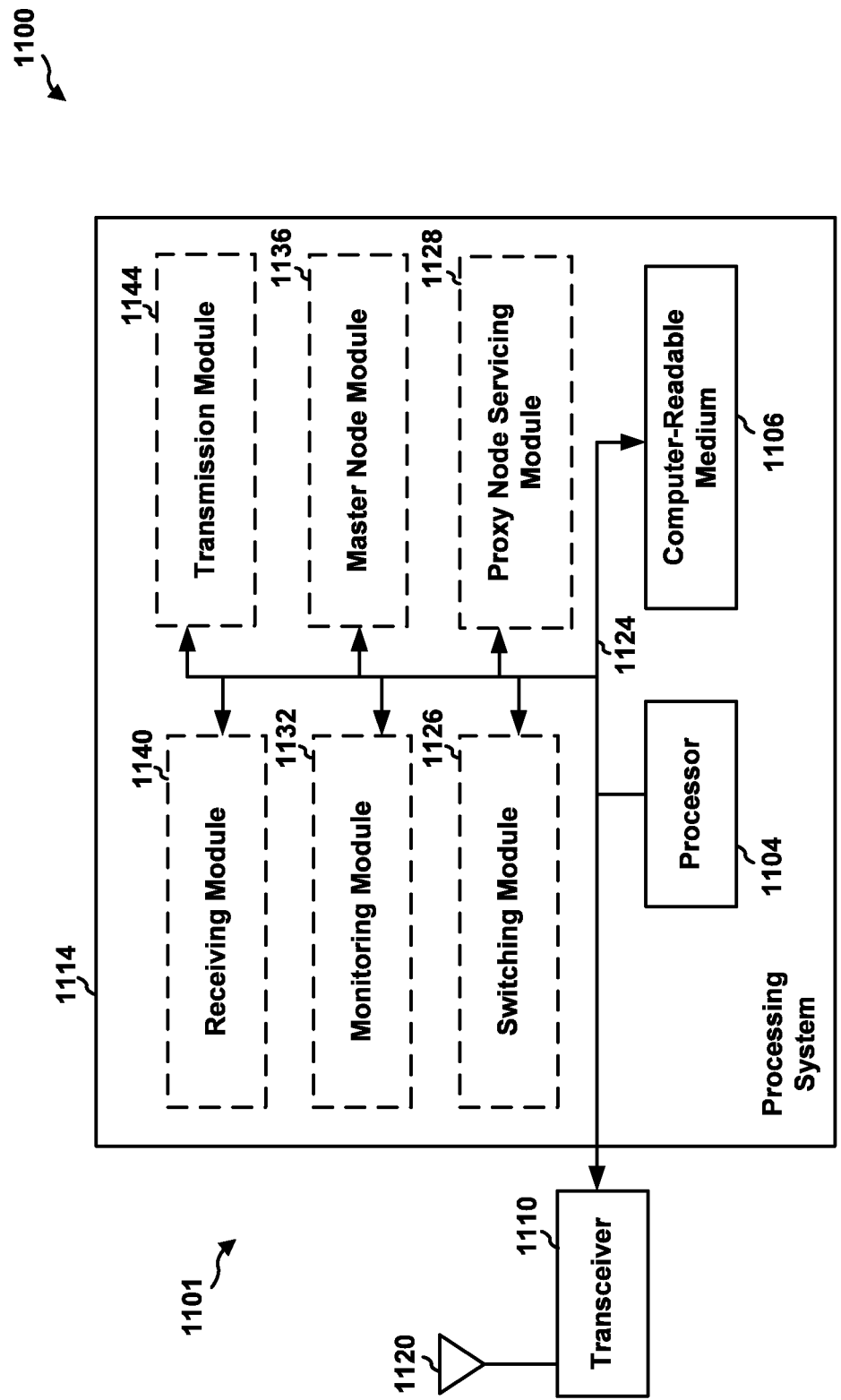
FIG. 11 is a diagram illustrating an example of a hardware implementation for an apparatus employing a processing system according to an aspect of the present disclosure, e.g., FIG. 7.

FIG. 11 is a diagram 1100 illustrating an example of a hardware implementation for an apparatus 1101 employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware modules, represented by the processor 1104, the modules 1126, 1128, 1132, 1136, 1140, 1144, and the computer-readable medium 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The processing system 1114 includes a processor 1104 coupled to a computer-readable medium 1106. The processor 1104 is responsible for general processing, including the execution of software stored on the computer-readable medium 1106. The software, when executed by the processor 1104, causes the processing system 1114 to perform the various functions described supra for any particular apparatus. The computer-readable medium 1106 may also be used for storing data that is manipulated by the processor 1104 when executing software.

The processing system further includes at least one of the components or modules 1126, 1128, 1132, 1136, 1140 and 1144. The modules may be software modules running in the processor 1104, resident/stored in the computer-readable medium 1106, one or more hardware modules coupled to the processor 1104, or some combination thereof. The processing system 1114 may be a component of the UE 650 (FIG. 6) and may include the memory 660 and/or at least one of the TX processor 668, the RX processor 656, and the controller/processor 659. In other aspects, the processing system 1114 may be a component of the node 702 (FIG. 7) including system selection component 720.

It is understood that the specific order or hierarchy of steps in the processes disclosed is an illustration of example approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of communication, comprising:
   determining that a node is part of a subset of nodes based at least in part on one or more characteristics of the node, wherein each node in the subset of nodes performs one or more system scans for a set of nodes that includes the subset of nodes and wherein the one or more characteristics include that the node is not in a connected state such that the subset of nodes comprises one or more nodes that minimize an amount of power consumed per system scan per Radio Access Technologies (RATs) for the set of nodes;
   performing the one or more system scans by the node on one or more RATs in response to determining that the node is part of the subset of nodes;
   obtaining one or more system scan results from the one or more system scans on the one or more RATs; and
   transmitting the one or more system scan results to the set of nodes, wherein each node in the set of nodes is configured to determine whether to switch from a first RAT to a second RAT based at least in part on the one or more system scan results.

2. The method of claim 1, wherein the one or more characteristics comprise at least one or more of RAT similarities with the nodes in the set of nodes, an amount of power consumed per system scan per RAT, and whether the node has voice capabilities.

3. The method of claim 1, wherein performing the one or more system scans comprises performing a parallel system scan for the first RAT, wherein each node in the subset of nodes performs the parallel system scan for a respective RAT from the one or more RATs.

4. The method of claim 1, wherein transmitting the one or more system scan results to the set of nodes comprises transmitting the one or more system scan results via peer-to-peer (P2P) connectivity between the node and the nodes in the set of nodes, wherein the P2P connectivity comprises connectivity via one or more of Bluetooth, or wireless local area network (WLAN), or wireless wide area network (WWAN), or WiFi, or Long Term Evolution (LTE), or D-bus.

5. The method of claim 1, further comprising:
obtaining one or more subsequent system scan results from one or more nodes that are part of the subset of nodes; and
determining whether to switch from the first RAT to the second RAT based at least in part on one or both of the one or more system scan results and the one or more subsequent system scan results, wherein the switch from the first RAT to the second RAT comprises one or more of disabling the first RAT, or preventing a timing association of an associated Public Land Mobile Network (PLMN) for the first RAT, or forbidding a PLMN identification (ID) for the first RAT.

6. The method of claim 1, wherein the one or more system scan results comprises RAT signal quality information.

7. An apparatus for communication, comprising:
means for determining that a node is part of a subset of nodes based at least in part on one or more characteristics of the node, wherein each node in the subset of nodes performs one or more system scans for a set of nodes that includes the subset of nodes, and wherein the one or more characteristics include that the node is not in a connected state such that the subset of nodes comprises one or more nodes that minimize an amount of power consumed per system scan per Radio Access Technologies (RATs) for the set of nodes;
means for performing the one or more system scans by the node on one or more RATs in response to determining that the node is part of the subset of nodes;
means for obtaining one or more system scan results from the one or more system scans on the one or more RATs; and
means for transmitting the one or more system scan results to the set of nodes, wherein each node in the set of nodes is configured to determine whether to switch from a first RAT to a second RAT based at least in part on the one or more system scan results.

8. A non-transitory computer-readable medium storing computer executable code for communication, comprising:
code for determining that a node is part of a subset of nodes based at least in part on one or more characteristics of the node, wherein each node in the subset of nodes performs one or more system scans for a set of nodes that includes the subset of nodes, and wherein the one or more characteristics include that the node is not in a connected state such that the subset of nodes comprises one or more nodes that minimize an amount of power consumed per system scan per Radio Access Technologies (RATs) for the set of nodes;
code for performing the one or more system scans by the node on one or more RATs in response to determining that the node is part of the subset of nodes;
code for obtaining one or more system scan results from the one or more system scans on the one or more RATs; and
code for transmitting the one or more system scan results to the set of nodes, wherein each node in the set of nodes is configured to determine whether to switch from a first RAT to a second RAT based at least in part on the one or more system scan results.

9. An apparatus for communication, comprising:
a memory; and
a processor in communication with the memory, wherein the processor is configured to:
determine that a node is part of a subset of nodes based at least in part on one or more characteristics of the node, wherein each node in the subset of nodes performs one or more system scans for a set of nodes that includes the subset of nodes, and wherein the one or more characteristics include that the node is not in a connected state such that the subset of nodes comprises one or more nodes that minimize an amount of power consumed per system scan per Radio Access Technologies (RATs) for the set of nodes;
perform the one or more system scans by the node on one or more RATs in response to determining that the node is part of the subset of nodes;
obtain one or more system scan results from the one or more system scans on the one or more RATs; and
transmit the one or more system scan results to the set of nodes, wherein each node in the set of nodes is configured to determine whether to switch from a first RAT to a second RAT based at least in part on the one or more system scan results.

10. The apparatus of claim 9, wherein the one or more characteristics comprise at least one or more of RAT similarities with the nodes in the set of nodes, an amount of power consumed per system scan per RAT, and whether the node has voice capabilities.

11. The apparatus of claim 9, wherein the processor is further configured to perform a parallel system scan for the first RAT, wherein each node in the subset of nodes performs the parallel system scan for a respective RAT.

12. The apparatus of claim 9, wherein the processor is further configured to transmit the one or more system scan results via peer-to-peer (P2P) connectivity between the node and the nodes in the set of nodes, wherein the P2P connectivity comprises connectivity via one or more of Bluetooth, wireless local area network (WLAN), wireless wide area network (WWAN), WiFi, Long Term Evolution (LTE), and D-bus.

13. The apparatus of claim 9, wherein the processor is further configured to:
obtain one or more subsequent system scan results from one or more nodes that are part of the subset of nodes; and
determine whether to switch from the first RAT to the second RAT based at least in part on one or both of the one or more system scan results and the one or more subsequent system scan results, wherein switching from the first RAT to the second RAT comprises one or more of disabling the first RAT, preventing a timing association of an associated Public Land Mobile Network (PLMN) for the first RAT, and forbidding a PLMN identification (ID) for the first RAT.

14. The apparatus of claim 9, wherein the one or more system scan results comprises RAT signal quality information.

15. A method of communication, comprising:
determining that a node is part of a first subset of nodes based at least in part on one or more characteristics of the node, wherein each node in the first subset is prohibited from performing one or more system scans on one or more Radio Access Technologies (RATs, and wherein the one or more characteristics include that the node is in a connected state such that the first subset of nodes comprises one or more nodes that do not minimize an amount of power consumed per system scan per RAT for the set of nodes;

monitoring for one or more system scan results transmitted by a second subset of nodes, wherein each node in the second subset performs one or more system scans for a set of nodes that at least includes the first subset of nodes;

receiving the one or more system scan results from the second subset of nodes; and determining whether to switch from a first RAT to a second RAT based at least in part on the one or more system scan results.

16. The method of claim 15, wherein the one or more characteristics comprise at least one or more of RAT similarities with the nodes in the set of nodes, an amount of power consumed per system scan per RAT, and whether the node has voice capabilities.

17. The method of claim 15, wherein performing the one or more system scans comprises performing a parallel system scan for the first RAT, wherein each node in the second subset of nodes performs the parallel system scan for a respective RAT.

18. The method of claim 15, wherein receiving the one or more system scan results from the second subset of nodes comprises receiving the one or more system scan results via peer-to-peer (P2P) connectivity between the node and the nodes in the second subset of nodes, wherein the P2P connectivity comprises connectivity via one or more of Bluetooth, wireless local area network (WLAN), wireless wide area network (WWAN), WiFi, Long Term Evolution (LTE), and D-bus.

19. The method of claim 15, further comprising:
receiving one or more subsequent system scan results from one or more nodes that are part of the second subset of nodes; and
determining whether to switch from the first RAT to the second RAT based at least in part on one or both of the one or more system scan results and the one or more subsequent system scan results, wherein switching from the first RAT to the second RAT comprises one or more of disabling the first RAT, preventing a timing association of an associated Public Land Mobile Network (PLMN) for the first RAT, and forbidding a PLMN identification (ID) for the first RAT.

20. A non-transitory computer-readable medium storing computer-executable code for communication, comprising:
code for determining that a node is part of a first subset of nodes based at least in part on one or more characteristics of the node, wherein each node in the first subset is prohibited from performing one or more system scans on one or more Radio Access Technologies (RATs, and wherein the one or more characteristics include that the node is in a connected state such that the first subset of nodes comprises one or more nodes that do not minimize an amount of power consumed per system scan per RAT for the set of nodes;
code for monitoring for one or more system scan results transmitted by a second subset of nodes, wherein each node in the second subset performs one or more system scans for a set of nodes that at least includes the first subset of nodes;
code for receiving the one or more system scan results from the second subset of nodes; and
code for determining whether to switch from a first RAT to a second RAT based at least in part on the one or more system scan results.

21. An apparatus for communication, comprising:
means for determining that a node is part of a first subset of nodes based at least in part on one or more characteristics of the node, wherein each node in the first subset is prohibited from performing one or more system scans on one or more Radio Access Technologies (RATs), and wherein the one or more characteristics include that the node is not in a connected state such that the first subset of nodes comprises one or more nodes that do not minimize an amount of power consumed per system scan per RAT for the set of nodes;
means for monitoring for one or more system scan results transmitted by a second subset of nodes, wherein each node in the second subset performs one or more system scans for a set of nodes that at least includes the first subset of nodes;
means for receiving the one or more system scan results from the second subset of nodes; and
means for determining whether to switch from a first RAT to a second RAT based at least in part on the one or more system scan results.

22. An apparatus for communication, comprising:
a memory; and
a processor in communication with the memory, wherein the processor is configured to:
determine that a node is part of a first subset of nodes based at least in part on one or more characteristics of the node, wherein each node in the first subset is prohibited from performing one or more system scans on one or more Radio Access Technologies (RATs, and wherein the one or more characteristics include that the node is not in a connected state such that the first subset of nodes comprises one or more nodes that do not minimize an amount of power consumed per system scan per RAT for the set of nodes;
monitor for one or more system scan results transmitted by a second subset of nodes, wherein each node in the second subset performs one or more system scans for a set of nodes that at least includes the first subset of nodes;
receive the one or more system scan results from the second subset of nodes; and
determine whether to switch from a first RAT to a second RAT based at least in part on the one or more system scan results.

23. The apparatus of claim 22, wherein the one or more characteristics comprise at least one or more of RAT similarities with the nodes in the set of nodes, an amount of power consumed per system scan per RAT, and whether the node has voice capabilities.

24. The apparatus of claim 22, wherein the processor configured to perform the one or more system scans is further configured to perform a parallel system scan for the first RAT, wherein each node in the second subset of nodes performs the parallel system scan for a respective RAT.

25. The apparatus of claim 22, wherein the processor is further configured to receive the one or more system scan results via peer-to-peer (P2P) connectivity between the node and the nodes in the second subset of nodes, wherein the P2P connectivity comprises connectivity via one or more of Bluetooth, wireless local area network (WLAN), wireless wide area network (WWAN), WiFi, Long Term Evolution (LTE), and D-bus.

26. The apparatus of claim 22, wherein the processor is further configured to:
receive one or more subsequent system scan results from one or more nodes that are part of the second subset of nodes; and determine whether to switch from the first RAT to the second RAT based at least in part on one or both of the one or more system scan results and the one or more subsequent system scan results, wherein switching from the first RAT to the second RAT comprises one or more of disabling the first RAT, preventing a timing association of an associated Public Land Mobile Network (PLMN) for the first RAT, and forbidding a PLMN identification (ID) for the first RAT.

* * * * *